United States Patent
Tang

(10) Patent No.: US 8,853,913 B2
(45) Date of Patent: Oct. 7, 2014

(54) MOUNTING STRUCTURE FOR SLOT PAPER IN A MOTOR STATOR

(75) Inventor: Songfa Tang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 410 days.

(21) Appl. No.: 13/305,733

(22) Filed: Nov. 28, 2011

(65) Prior Publication Data

US 2012/0153767 A1    Jun. 21, 2012

(30) Foreign Application Priority Data

Dec. 20, 2010    (CN) .................. 2010 2 0680566 U

(51) Int. Cl.
*H02K 3/34*    (2006.01)
*H02K 3/52*    (2006.01)

(52) U.S. Cl.
CPC ............... *H02K 3/522* (2013.01); *H02K 3/345* (2013.01)
USPC ........................................ 310/215; 310/260

(58) Field of Classification Search
CPC ........... H02K 3/34; H02K 3/345; H02K 3/48; H02K 3/487
USPC .................................................. 310/215, 260
See application file for complete search history.

(56) References Cited

U.S. PATENT DOCUMENTS

| | | | | |
|---|---|---|---|---|
| 5,763,978 | A | * | 6/1998 | Uchida et al. .................. 310/215 |
| 5,979,087 | A | * | 11/1999 | Bell et al. ............... 310/216.001 |
| 6,414,413 | B1 | * | 7/2002 | Arai et al. ...................... 310/214 |
| 8,076,819 | B2 | * | 12/2011 | Taema .......................... 310/215 |
| 2002/0047457 | A1 | * | 4/2002 | Yoshikawa et al. ........... 310/215 |
| 2002/0089250 | A1 | * | 7/2002 | Naka et al. .................... 310/215 |
| 2009/0134742 | A1 | * | 5/2009 | Rhode ........................... 310/218 |
| 2009/0324435 | A1 | * | 12/2009 | Sears et al. ................. 417/423.7 |
| 2011/0109189 | A1 | * | 5/2011 | Taema .......................... 310/215 |

* cited by examiner

*Primary Examiner* — Quyen Leung
*Assistant Examiner* — Naishadh Desai
(74) *Attorney, Agent, or Firm* — Matthias Scholl P.C.; Matthias Scholl

(57) ABSTRACT

A mounting structure for slot paper in a motor stator. The slot paper is embedded in stator slots and includes a paper bottom, a paper side, and a paper front. A lug boss is protruded between two adjacent tooth block segments and protrudes from the inner wall of an outer ring. Two ends of the slot paper extend out of each stator slot. Two ends of the paper bottom are locked between the lug bosses respectively arranged on the upper end insulator and the lower end insulator. One end of each tooth block segment is provided with a clip slot and the paper front near the opening is embedded therein. The structure is simple, has a precise slot paper positioning function, does not occupy space of the stator slot, maximizes the slot filling ratio of the slots, and thus improves the overall performance of the motor.

13 Claims, 7 Drawing Sheets

MOUNTING STRUCTURE FOR SLOT PAPER IN A MOTOR STATOR

CROSS-REFERENCE TO RELATED APPLICATIONS

Pursuant to 35 U.S.C. §119 and the Paris Convention Treaty, this application claims the benefit of Chinese Patent Application No. 201020680566.0 filed Dec. 20, 2010, the contents of which are incorporated herein by reference.

BACKGROUND OF THE INVENTION

1. Field of the Invention

The invention relates to a mounting structure for slot paper in a motor stator.

2. Description of the Related Art

A conventional mounting structure for slot paper in a motor stator includes a stator core, an upper end insulator, a lower end insulator, and slot paper, in which the upper end insulator and the lower end insulator are mounted on two end surfaces of the stator core, respectively. The stator core includes a stator yoke, stator teeth, and stator slots. The slot paper is embedded in the slots. The slot paper, the upper end insulator, and the lower end insulator provide insulation for the stator, thereby enabling the coil winding to be insulatedly spaced from the stator core.

For conventional brushless motors, a plurality of components is protruded from the end insulation portion into the slots to press or clamp the slot paper, which, however, makes the slot volume decreased and reduces the filling ratio of the stator slots, i.e. ratio of space filled by stator windings, thereby affecting the overall performance of the motor.

SUMMARY OF THE INVENTION

In view of the above-described problems, it is one objective of the invention to provide a mounting structure for slot paper in a motor stator that has a simple and reasonable structure with precise slot paper positioning function and shall not occupy the space of the stator slots. Thus, the mounting structure maximizes the slot filling ratio of the slots to the largest extent and improves the overall performance of the motor.

To achieve the above objective, in accordance with one embodiment of the invention, there provided is a mounting structure for slot paper in a motor stator, comprising a stator core, an upper end insulator, a lower end insulator, and slot paper, wherein the upper end insulator and the lower end insulator are mounted on two end surfaces of the stator core, respectively; the stator core comprises a stator yoke, stator teeth and stator slots having an opening; the slot paper is embedded in the stator slots; the slot paper comprises a paper bottom, a paper side, and a paper front; the upper end insulator and the lower end insulator each comprises an outer ring and a plurality of tooth block segments extending from the inner wall thereof; the outer ring is arranged on the surface of the stator yoke; the tooth block segments are arranged on the surface of the stator teeth; a lug boss is protruded between two adjacent tooth block segments and from the inner wall of the outer ring; two ends of the slot paper extend out of each stator slot; two ends of the paper bottom are locked between the lug boss arranged on the upper end insulator and the lug boss arranged on the lower end insulator; one end of each tooth block segment at both sides of the opening of the stator slot is provided with a clip slot and the paper front near the opening is embedded therein.

In a class of this embodiment, the upper end insulator and the lower end insulator are each arranged with a convex column, which is sheathed in a positioning hole of the stator core.

In a class of this embodiment, the paper front corresponding to the opening of the stator slot comprises a gap.

In a class of this embodiment, the lug boss is spaced apart from the end surface of the stator core.

In a class of this embodiment, surfaces of both the upper end insulator and the lower end insulator contacting two end surfaces of the stator core are planes.

Advantages of the invention are summarized below:

1) the upper end insulator and the lower end insulator each comprises an outer ring and a plurality of tooth block segments extending from the inner wall thereof; the outer ring is arranged on the surface of the stator yoke; the tooth block segments are arranged on the surface of the stator teeth; a lug boss is protruded between two adjacent tooth block segments and from the inner wall of the outer ring; two ends of the slot paper extend out of each stator slot; the paper bottom closely sticks to the bottom wall of each stator slot, and two ends of the paper bottom are locked between the lug boss arranged on the upper end insulator and the lug boss arranged on the lower end insulator; one end of each of the tooth block segments at both sides of the opening of the stator slot is arranged with a clip slot, and the paper front near the opening is embedded in the clip slot; the structure of both the upper end insulator and the lower end insulator for positioning the slot paper is outside each stator slot. Such structure does not occupy the space of the stator slots, thus it maximizes the slot filling ratio of the slots to the largest extent and the overall performance of the motor has been improved;

2) two ends of the paper bottom of the slot paper are held by two lug bosses, the paper front near the slot opening is embedded in the clip slot to form a triangle structure with two locked points and one supporting point. Consequently, the slot paper can be precisely and securely positioned without any deformation and meanwhile such structure is simple and mounting friendly; and 3) the upper end insulator and the lower end insulator is each arranged with a convex column, which is sheathed in the positioning hole of the stator core, so that the slot paper can be simply mounted and precisely positioned.

DETAILED DESCRIPTION OF THE EMBODIMENTS

The invention is explained in further detail below with the reference to the embodiments and attached drawings.

Figure 1:
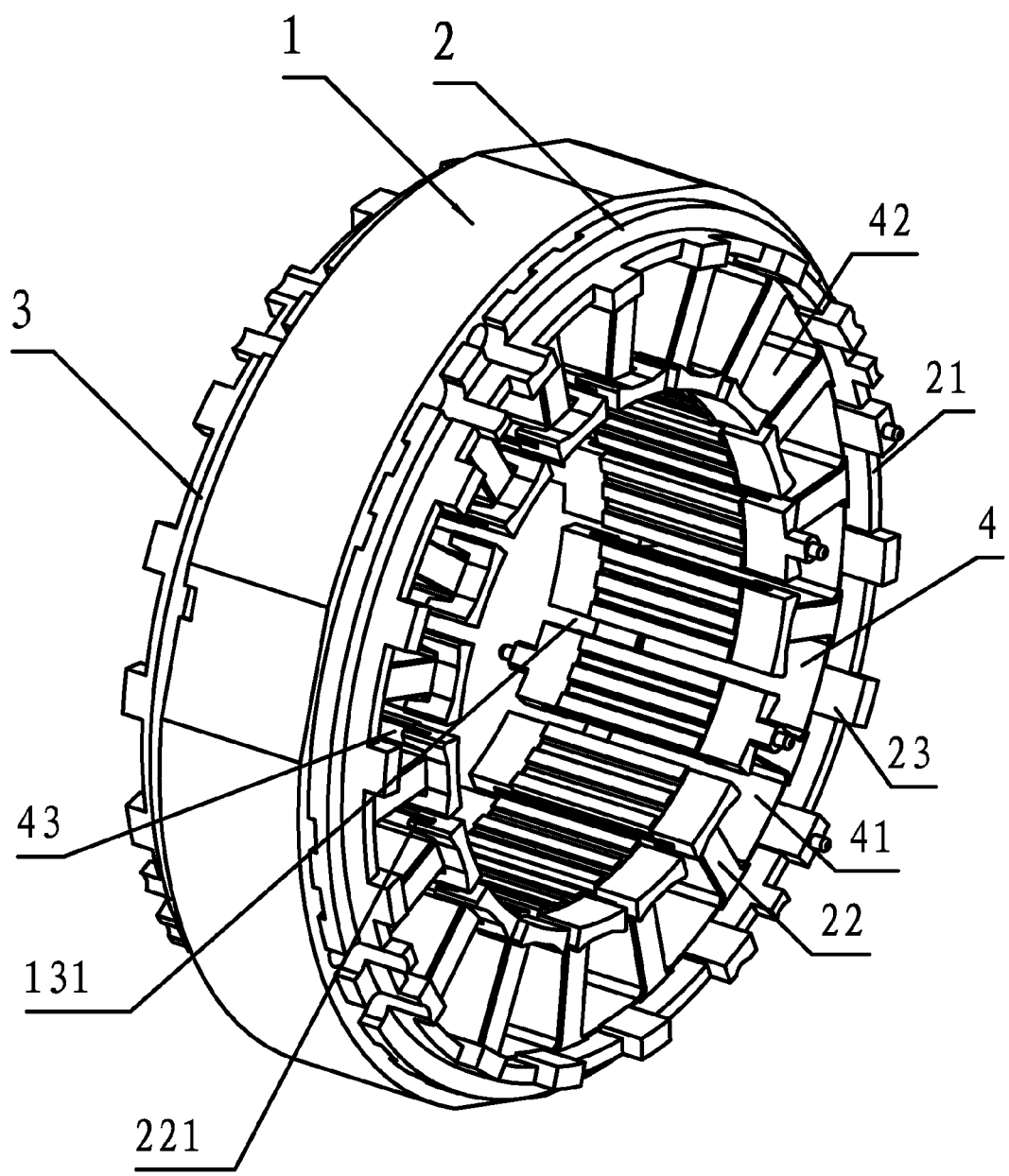
FIG. 1 is a three-dimensional diagram of a mounting structure for slot paper in a motor stator in accordance with one embodiment of the invention.
Figure 2:
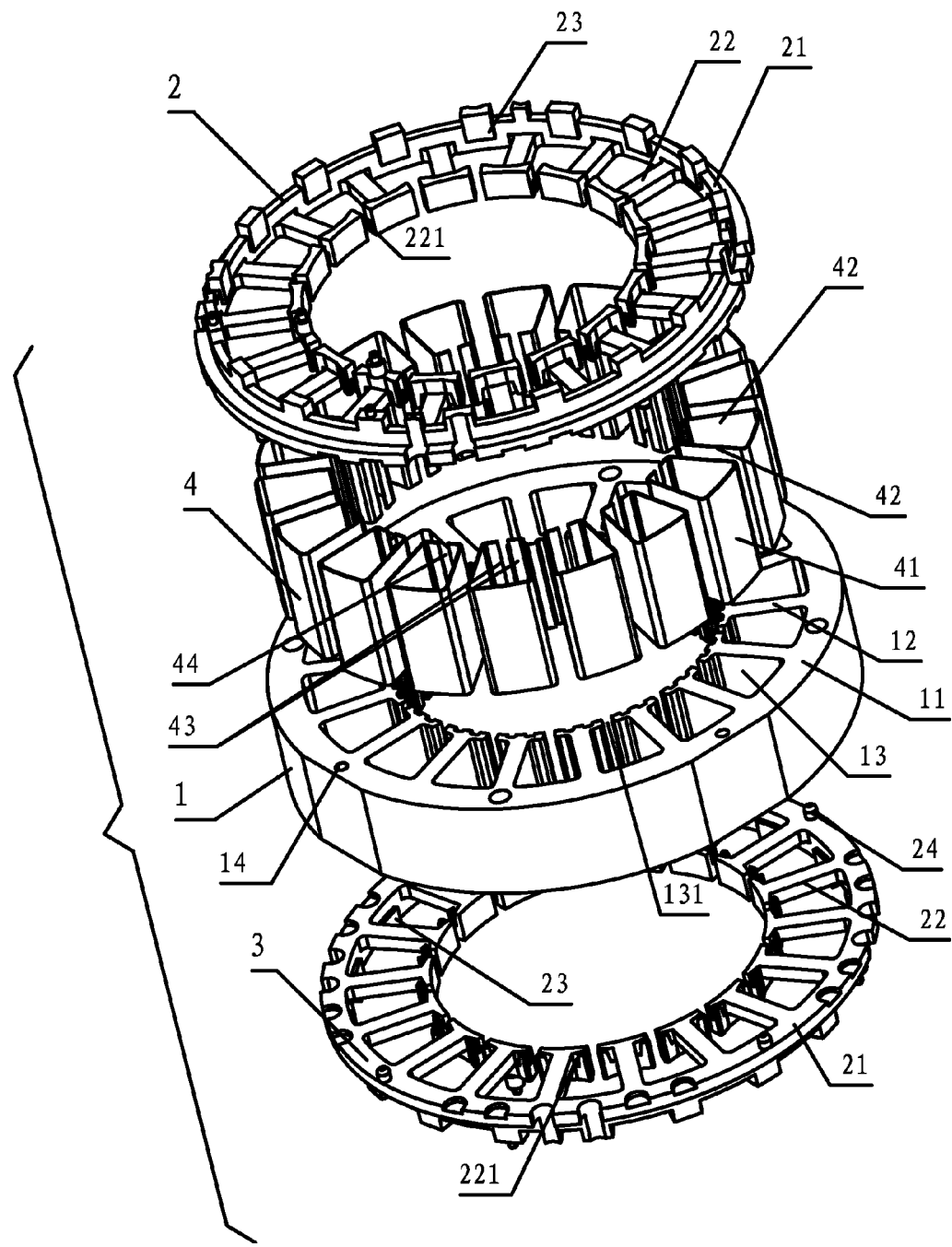
FIG. 2 is an exploded view of a mounting structure for slot paper in a motor stator in accordance with one embodiment of the invention.
Figure 3:
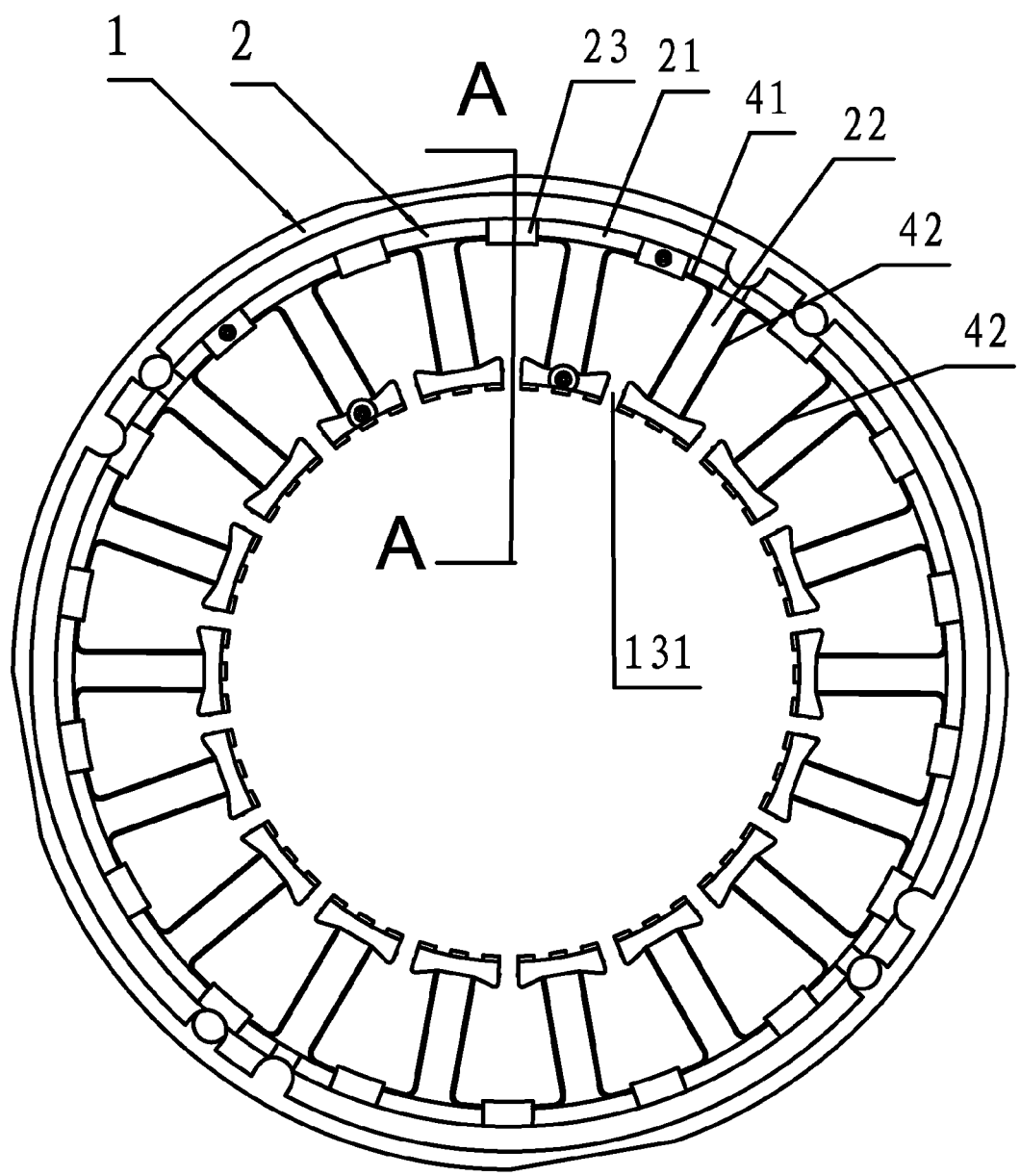
FIG. 3 is a front view of a mounting structure for slot paper in a motor stator in accordance with one embodiment of the invention.
Figure 4:
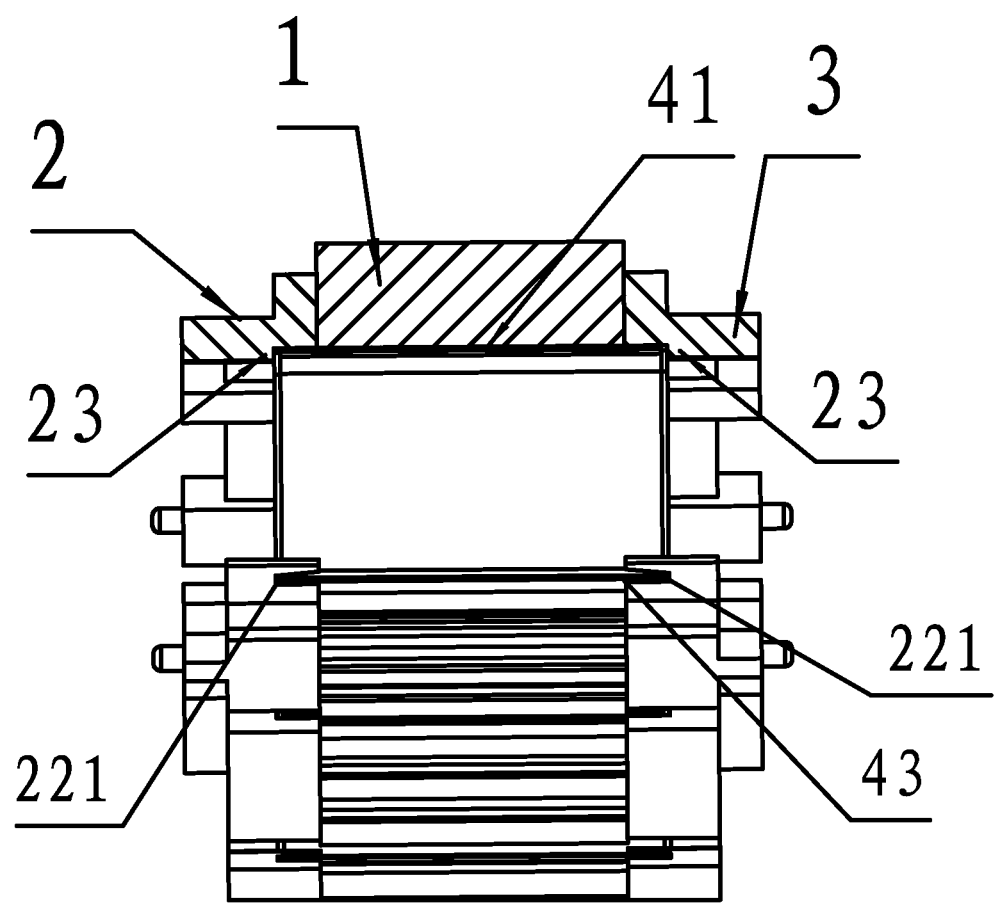
FIG. 4 is an A-A sectional view of FIG. 3.
Figure 5:
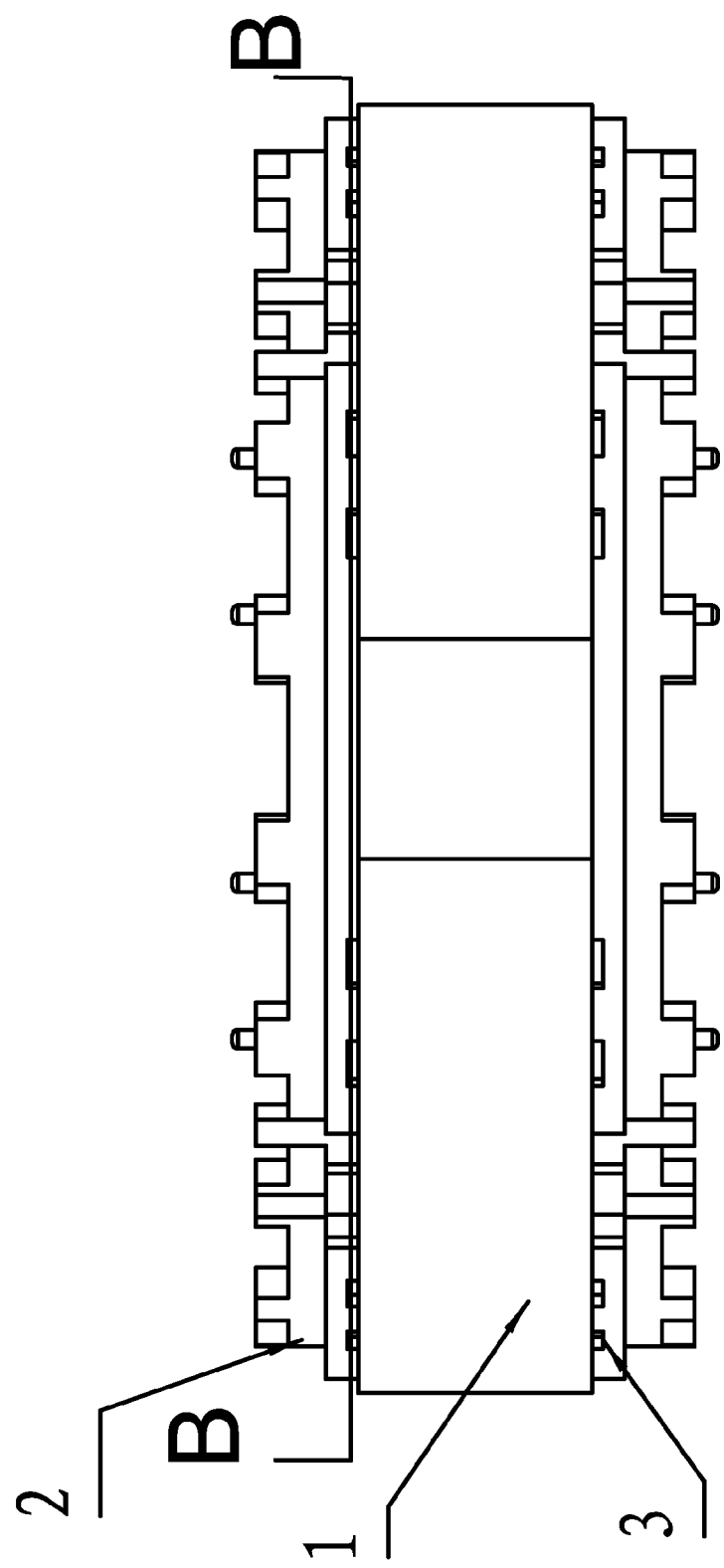
FIG. 5 is a side view of a mounting structure for slot paper in a motor stator in accordance with one embodiment of the invention.
Figure 6:
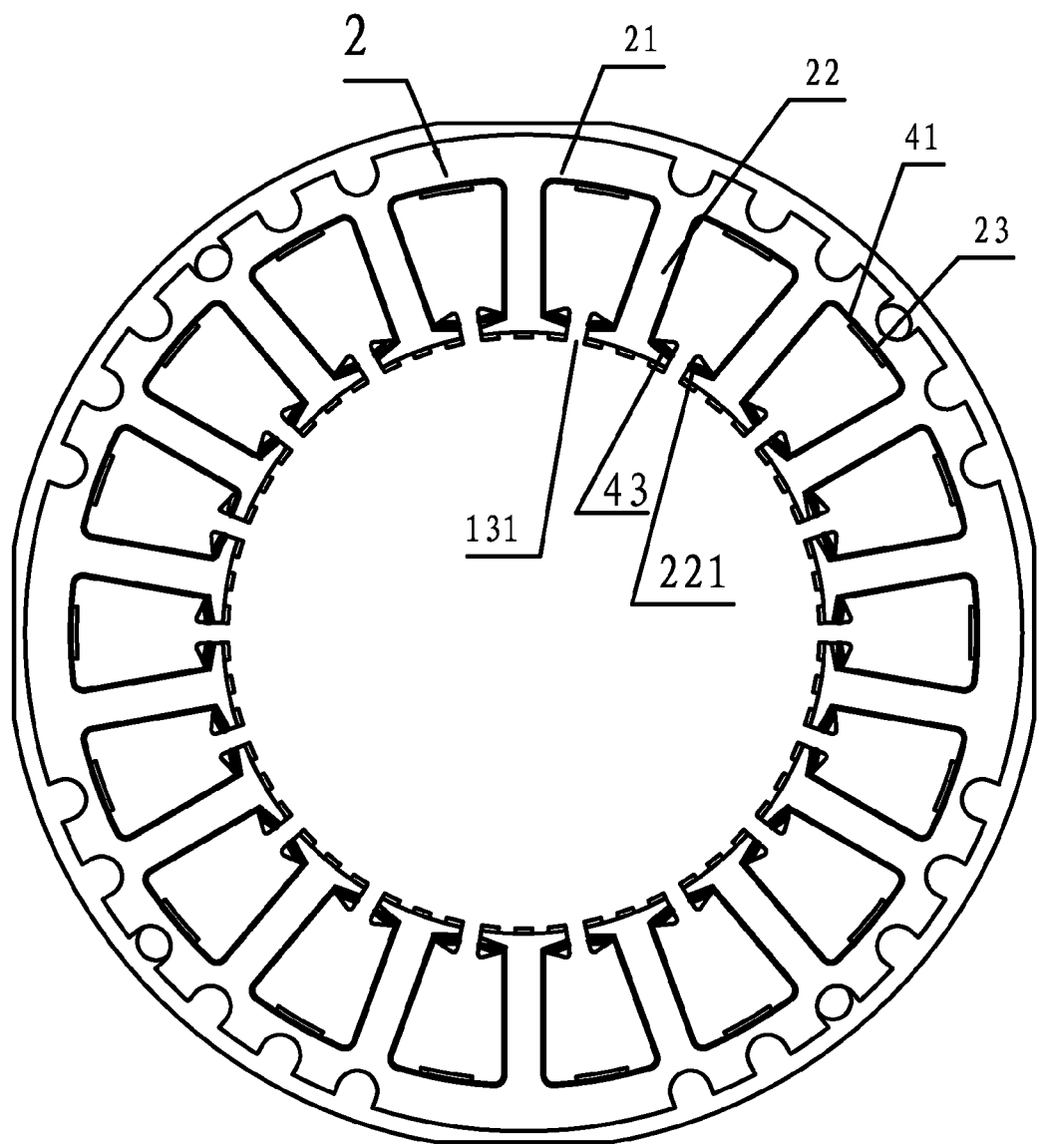
FIG. 6 is a B-B sectional view of FIG. 5.
Figure 7:
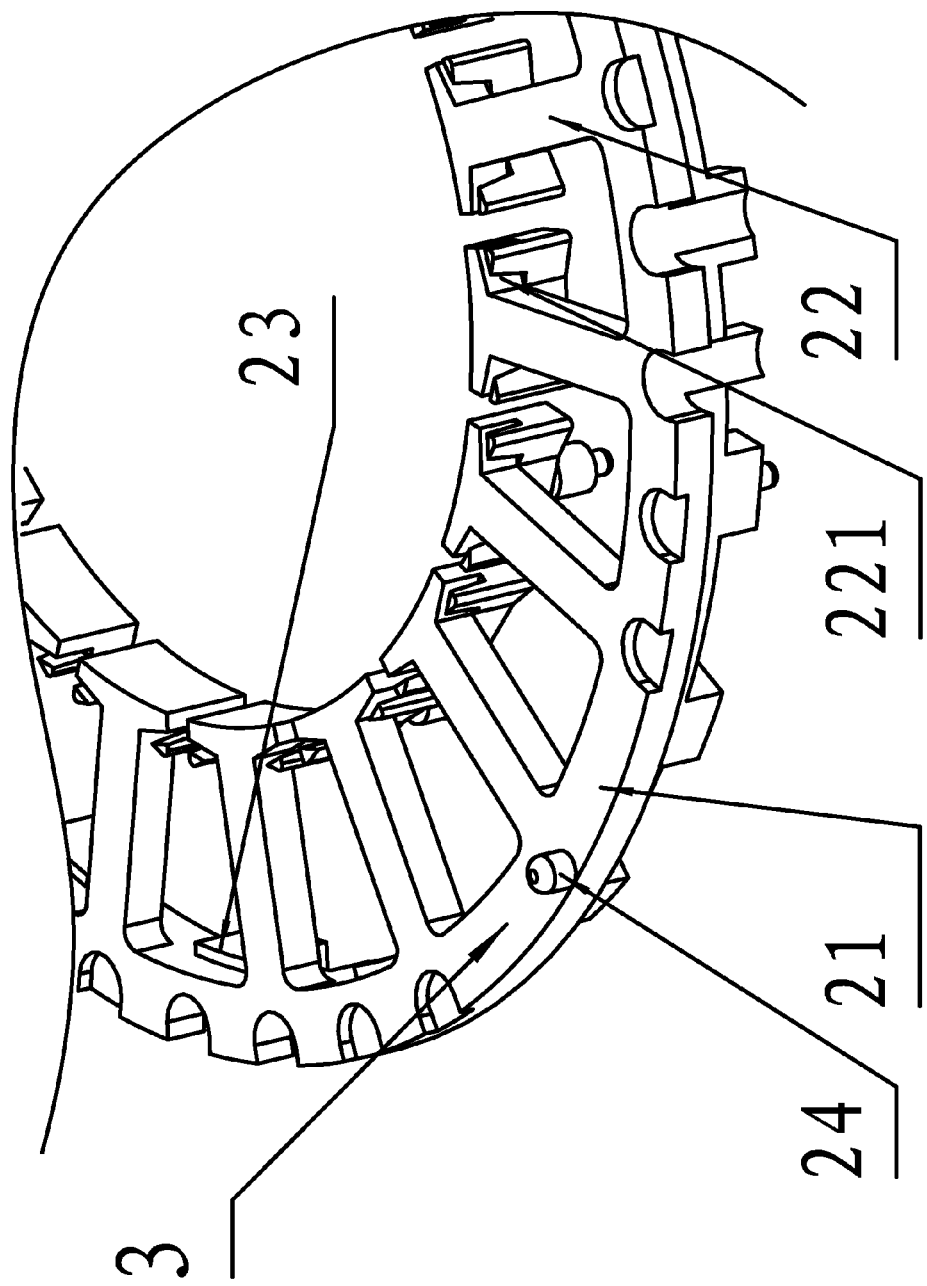
FIG. 7 is a partial enlarged view of a lower end insulator of a mounting structure for slot paper in a motor stator in accordance with one embodiment of the invention.

As shown in FIGS. 1-7, a mounting structure for slot paper in a motor stator, in accordance with the invention, comprises a stator core 1, an upper end insulator 2, a lower end insulator 3, and slot paper 4. The upper end insulator 2 and the lower end insulator 3 are mounted on two end surfaces of the stator core 1, respectively. The stator core 1 comprises a stator yoke 11, stator teeth 12, and stator slots 13 having an opening 131. The slot paper 4 is embedded in the stator slots 13. The slot paper 4 comprises a paper bottom 41, a paper side 42, and a paper front 43. The upper end insulator 2 and the lower end insulator 3 each comprises an outer ring 21 and a plurality of tooth block segments 22 extending from the inner wall thereof. The outer ring 21 is arranged on the surface of the stator yoke 11. The tooth block segments 22 are arranged on the surface of the stator teeth 12. A lug boss 23 is protruded between two adjacent tooth block segments 22 and from the inner wall of the outer ring 21. Two ends of the slot paper 4 extend out of each stator slot 13. The paper bottom 41 closely sticks to the bottom wall of each stator slot 13, and two ends of the paper bottom 41 are locked between the lug boss 23 arranged on the upper end insulator 2 and the lug boss 23 arranged on the lower end insulator 3. One end of each of the tooth block segments 22 at both sides of the opening 131 are arranged with a clip slot 221. The paper front 43 near the opening 131 is embedded in the clip slot 221. The upper end insulator 2 and the lower end insulator 3 are each arranged with a convex column 24, which is sheathed in a positioning hole 14 of the stator core 1. The paper front 43 corresponding to the opening 131 comprises a gap 44. The lug bosses 23 are spaced apart from the end surface of the stator core 1. The surfaces 13 of both the upper end insulator 2 and the lower end insulator 3 contacting two end surfaces of the stator core 1 are planes.

The working principle of the mounting structure for slot paper in a motor stator in accordance with the invention is as follows. Two ends of the slot paper 4 extend out of each stator slot 13. The paper bottom 41 closely sticks to the bottom wall of each stator slot 13. Two ends of the paper bottom 41 are locked between the lug boss 23 arranged on the upper end insulator 2 and the lug boss 23 arranged on the lower end insulator 3. One end of the tooth block segments 22 at both sides of the slot opening 131 are arranged with a clip slot 221. The paper front 43 near the slot opening 131 is embedded in the clip slot 221 and the structure of both the upper end insulator 2 and the lower end insulator 3 for positioning the slot paper 4 is outside each stator slot 13. Such structure does not occupy the space of the stator slots 13, thus it maximizes the slot filling ratio of the slots 13 to the largest extent and the overall performance of the motor has been improved. Two ends of the paper bottom 41 of the slot paper 4 are held by two lug bosses 23 without moving up and down. The paper front 43 near the slot opening 131 is embedded in the clip slot 221 to form a triangle structure with two locked points and one supporting point. Consequently, the slot paper can be precisely and securely positioned without any deformation and meanwhile such structure is simple and mounting friendly.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor stator comprising:
 a) a stator core comprising a stator yoke, a plurality of stator teeth, and a plurality of stator slots each extending from the inner wall of the stator yoke, each of the plurality of stator slots having a back surface, a side surface, a front surface, and an opening;
 b) an upper end insulator comprising a first outer ring and a plurality of tooth block segments each extending from the inner wall of the first outer ring;
 c) a lower end insulator comprising a second outer ring and a plurality of tooth block segments each extending from the inner wall of the second outer ring;
 d) a slot paper comprising a paper back, a paper side, and a paper front; and
 e) a first lug boss;
 f) a second lug boss;
 g) a first clip slot; and
 h) a second clip slot;
wherein:
 the upper end insulator and the lower end insulator are mounted on two end surfaces of the stator core, respectively;
 the back surface is disposed on the stator yoke, the front surface is disposed opposite to the back surface and is disposed on the front end of one of the plurality of stator teeth which is disposed away from the stator yoke, the side surface connects between the front surface and the back surface, and the opening is disposed on the front surface;
 the slot paper is formed in a cylindrical shape and is embedded in one of the plurality of the stator slots;
 the paper back is in contact with the back surface, the paper side is in contact with the side surface, and the paper front is in contact with the front surface;
 the first outer ring and the second outer ring are arranged on two end surfaces of the stator yoke, respectively;
 each of the plurality of the tooth block segments is attached to one end surface of one of the plurality of the stator teeth;
 the first lug boss is disposed between two adjacent tooth block segments and protruding from the inner wall of the first outer ring;
 the second lug boss is disposed between two adjacent tooth block segments and protruding from the inner wall of the second outer ring;
 the first clip slot is disposed in a first portion of one of the plurality of the tooth block segments of the upper end insulator, and the first portion is disposed beside the opening;
 the second clip slot is disposed in a second portion of one of the plurality of the tooth block segments of the lower end insulator, and the second portion is disposed beside the opening;
 one end of the paper back extending out of the stator slot is blocked by the first lug boss and the other end of the paper back extending out of the stator slot is blocked by the second lug boss; and
 one end of the paper front extending out of the stator slot is inserted in the first clip slot and the other end of the paper front extending out of the stator slot is inserted in the second clip slot.

2. The motor stator of claim 1, wherein the upper end insulator and the lower end insulator are each arranged with a convex column; and the convex column is sheathed in a positioning hole of the stator core.

3. The motor stator of claim 1, wherein the paper front comprises a gap corresponding to the opening.

4. The motor stator of claim 1, wherein the first lug boss is spaced apart from one end surface of the stator core and the second lug is spaced apart from the other end surface of the stator core.

5. A combination of a motor stator, a slot paper, and a mounting structure for the slot paper in the motor stator, the combination comprising:

the motor stator comprising: a) a stator core comprising a stator yoke, a plurality of stator teeth, and a plurality of stator slots each extending from the inner wall of the stator yoke, each of the plurality of stator slots having a back surface, a side surface, a front surface, and an opening; b) an upper end insulator comprising a first outer ring and a plurality of tooth block segments each extending from the inner wall of the first outer ring; and c) a lower end insulator comprising a second outer ring and a plurality of tooth block segments each extending from the inner wall of the second outer ring;

the slot paper comprising a paper back, a paper side, and a paper front; and the mounting structure comprising: a first lug boss; a second lug boss; a first clip slot; and a second clip slot;

wherein:

the upper end insulator and the lower end insulator are mounted on two end surfaces of the stator core, respectively;

the back surface is disposed on the stator yoke, the front surface is disposed opposite to the back surface and is disposed on the front end of one of the plurality of stator teeth which is disposed away from the stator yoke, the side surface connects between the front surface and the back surface, and the opening is disposed on the front surface;

the slot paper is formed in a cylindrical shape and is embedded in one of the plurality of the stator slots;

the paper back is in contact with the back surface, the paper side is in contact with the side surface, and the paper front is in contact with the front surface;

the first outer ring and the second outer ring are arranged on two end surfaces of the stator yoke, respectively;

each of the plurality of the tooth block segments is attached to one end surface of one of the plurality of the stator teeth;

the first lug boss disposed between two adjacent tooth block segments and protruding from the inner wall of the outer ring;

the second lug boss is disposed between two adjacent tooth block segments and protruding from the inner wall of the second outer ring;

the first clip slot is disposed in a first portion of one of the plurality of the tooth block segments of the upper end insulator, and the first portion is disposed beside the opening;

the second clip slot is disposed in a second portion of one of the plurality of the tooth block segments of the lower end insulator, and the second portion is disposed beside the opening;

one end of the paper back extending out of the stator slot is blocked by the first lug boss and the other end of the paper back extending out of the stator slot is blocked by the second lug boss; and one end of the paper front extending out of the stator slot is inserted in the first clip slot and the other end of the paper front extending out of the stator slot is inserted in the second clip slot.

6. The combination of claim 5, wherein the upper end insulator and the lower end insulator are each arranged with a convex column; and the convex column is sheathed in a positioning hole of the stator core.

7. The combination of claim 6, wherein the paper front comprises a gap corresponding to the opening.

8. The combination of claim 5, wherein the first lug boss is spaced apart from one end surface of the stator core and the second lug is spaced apart from the other end surface of the stator core.

9. The combination of claim 6, wherein the first lug boss is spaced apart from one end surface of the stator core and the second lug is spaced apart from the other end surface of the stator core.

10. The combination of claim 7, wherein the first lug boss is spaced apart from one end surface of the stator core and the second lug is spaced apart from the other end surface of the stator core.

11. The combination of claim 5, wherein surfaces of the upper end insulator and the lower end insulator separately contacting the two end surfaces of the stator yoke are planes.

12. The combination of claim 6, wherein surfaces of the upper end insulator and the lower end insulator separately contacting the two end surfaces of the stator yoke are planes.

13. The combination of claim 7, wherein surfaces of the upper end insulator and the lower end insulator separately contacting the two end surfaces of the stator yoke are planes.

* * * * *